(12) United States Patent
Shinagawa et al.

(10) Patent No.: US 12,475,563 B2
(45) Date of Patent: Nov. 18, 2025

(54) METHOD FOR PROCESSING MEDICAL IMAGES

(71) Applicant: Siemens Healthineers AG, Forchheim (DE)

(72) Inventors: Yoshihisa Shinagawa, Downingtown, PA (US); Halid Yerebakan, Carmel, IN (US); Gerardo Hermosillo Valadez, West Chester, PA (US); Mahesh Ranganath, Malvern, PA (US); Simon Allen-Raffl, West Chester, PA (US)

(73) Assignee: Siemens Healthineers AG, Forchheim (DE)

( * ) Notice: Subject to any disclaimer, the term of this patent is extended or adjusted under 35 U.S.C. 154(b) by 262 days.

(21) Appl. No.: 18/312,802

(22) Filed: May 5, 2023

(65) Prior Publication Data

US 2024/0005503 A1    Jan. 4, 2024

(30) Foreign Application Priority Data

Jun. 30, 2022    (EP) .................................... 22182387

(51) Int. Cl.
| | | |
|---|---|---|
| *G06T 7/00* | (2017.01) | |
| *G06T 7/13* | (2017.01) | |
| *G06T 7/33* | (2017.01) | |
| *G06T 7/73* | (2017.01) | |
| *G06T 11/00* | (2006.01) | |

(52) U.S. Cl.
CPC .............. *G06T 7/0014* (2013.01); *G06T 7/13* (2017.01); *G06T 7/33* (2017.01); *G06T 7/73* (2017.01); *G06T 11/00* (2013.01); *G06T 2207/20084* (2013.01); *G06T 2207/30096* (2013.01); *G06T 2207/30204* (2013.01)

(58) Field of Classification Search
CPC ........... G06T 7/0014; G06T 7/13; G06T 7/33; G06T 7/73; G06T 2207/20084; G06T 2207/30096; G06T 2207/30204; G06T 7/337; G06T 2207/20101
See application file for complete search history.

(56) References Cited

U.S. PATENT DOCUMENTS

| | | | |
|---|---|---|---|
| 8,369,593 B2 | 2/2013 | Peng et al. | |
| 2012/0033865 A1 | 2/2012 | Fischer et al. | |
| 2014/0286628 A1* | 9/2014 | Ando ....................... | H04N 5/77 386/282 |

(Continued)

OTHER PUBLICATIONS

Boveiri, Hamid Reza, et al. "Medical image registration using deep neural networks: a comprehensive review." Computers & Electrical Engineering 87 (2020): 106767.

(Continued)

*Primary Examiner* — Grace Q Li

(57) ABSTRACT

A framework for processing medical images. The framework may include receiving a target medical image, a reference medical image and at least one marker associated with a location in the reference medical image. A corresponding location of the at least one marker is determined in the target medical image. The target medical image is overlaid with the at least one marker at the determined corresponding location to provide an overlaid image. Display data is generated to cause a display device to display the overlaid image.

20 Claims, 8 Drawing Sheets

(56) References Cited

U.S. PATENT DOCUMENTS

| | | | | |
|---|---|---|---|---|
| 2016/0058306 | A1* | 3/2016 | Kawasaki | A61B 5/0042 |
| | | | | 600/407 |
| 2017/0316566 | A1* | 11/2017 | Lee | G06T 11/203 |
| 2019/0122404 | A1* | 4/2019 | Freeman | G06V 40/161 |
| 2021/0042917 | A1* | 2/2021 | Hirai | G06V 10/751 |
| 2021/0251664 | A1* | 8/2021 | Pavlovskaia | G06T 17/20 |
| 2022/0208355 | A1* | 6/2022 | Li | G06T 7/174 |

OTHER PUBLICATIONS

Search Report in EP application No. 22182387.5, dated Dec. 20, 2022 (10 pages).
Yan, Ke, et al. "DeepLesion: automated mining of large-scale lesion annotations and universal lesion detection with deep learning." Journal of medical imaging 5.3 (2018): 036501-036501.

* cited by examiner

METHOD FOR PROCESSING MEDICAL IMAGES

CROSS-REFERENCE TO RELATED APPLICATION

This application claims the benefit of priority from European Patent Application No. 22182387.5, filed on Jun. 30, 2022, the contents of which are incorporated by reference.

TECHNICAL FIELD

The present framework relates to processing medical images.

BACKGROUND

In radiology, measuring tumors and anomalies is an important step for diagnosis so that the growth in size or deviation from normal ranges can be observed. However, it is also one of the most time-consuming steps. A radiologist must place multiple markers or lines on the images to have the distances and angles computed. An exemplary marker in the lesion marker dataset is disclosed in *Ke Yan, Xiaosong Wang, Le Lu, and Ronald M Summers*, "DeepLesion: automated mining of large-scale lesion annotations and universal lesion detection with deep learning," J Med Imaging (Bellingham), 2018 July; 5(3) and illustrated in FIG. 9, which is herein incorporated by reference.

There are many AI (Artificial Intelligence)-based tools proposed so far to automate the measurements such as ALPHA landmarking technology described in, for example, *Peng, Tao, Zhou, Zhan and Krishnan*, "Systems and methods for robust learning based annotation of medical radiographs." (see also U.S. Pat. No. 8,369,593 B2), which are herein incorporated by reference. AI measurement tools are known to be applicable to only specific organs and anomaly images. Choosing the correct AI tool itself may be tedious. Even more, common AI tools typically do not create relationships between findings of multiple studies across patient's history.

SUMMARY

A framework for processing medical images is provided. The framework may include receiving a target medical image, a reference medical image and at least one marker associated with a location in the reference medical image. A corresponding location of the at least one marker is determined in the target medical image. The target medical image is overlaid with the at least one marker at the determined corresponding location to provide an overlaid image. Display data is generated to cause a display device to display the overlaid image.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

Figure 1:
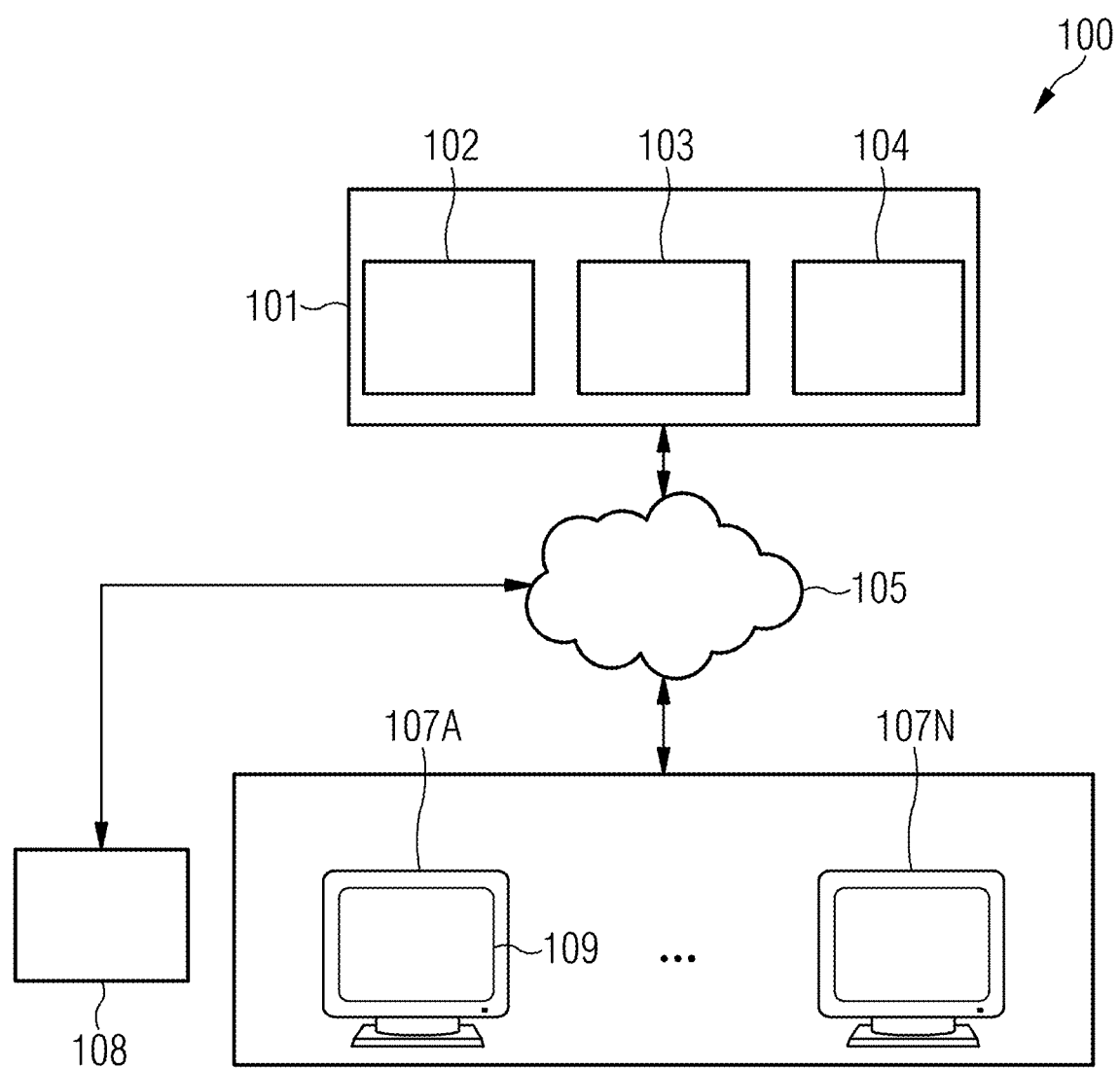
FIG. 1 illustrates a block diagram of a client-server architecture embodying a system for identifying a type of organ in a volumetric medical image.

The present framework enables an improved processing of medical images. According to a first aspect, a computer-implemented method for processing medical images, the method comprising:

a) receiving a target medical image;
b) receiving a reference medical image;
c) receiving at least one marker associated with a location in the reference medical image;
d) determining a corresponding location of the at least one marker in the target medical image;
e) overlaying the target medical image with the at least one marker at the determined corresponding location to provide an overlaid image; and
f) generating display data to cause a display device to display the overlaid image.

In follow-up studies, measurements are often already done in the prior studies (also termed "reference image(s)" herein). In such cases, a radiologist needs to go to the same location in the current study (also termed "target image" herein) as the prior studies and perform the measurement. It is a tedious step for radiologists. The method provided herein aims, in various embodiments, at—at least partially—automating such measurements; i.e., automatically transferring the locations of the measurements in the prior studies to the corresponding locations in the current study. In embodiments, markers and/or lines placed on the prior images are transferred to the corresponding locations in the current image, and the distances/angles are automatically computed. A radiologist may then modify the markers to fine tune or correct the measurements. The present method is advantageously not limited to a specific AI measurement tool.

The target and/or reference medical image may comprise one or more organs and/or portions thereof. An organ is to be understood as a collection of tissue joined in a structural unit to serve a common function. The organ may be a human organ. The organ may be any one of the following, for example: intestines, skeleton, kidneys, gall bladder, liver, muscles, arteries, heart, larynx, pharynx, brain, lymph nodes, lungs, spleen bone marrow, stomach, veins, pancreas, and bladder.

The target and/or reference medical image may be captured by and received from a medical imaging unit, the medical imaging unit may include, for example, but not limited to, a magnetic resonance imaging device, a computer tomography device, an X-ray imaging device, an ultrasound imaging device, etc.

The target image is, preferably, captured at a later point in time than the reference image. The target and/or the reference medical image and/or the at least one marker may be received in a computer memory or processor in steps a)-c) or received otherwise.

The target and/or reference medical image may be two- or three-dimensional (the latter also referred to as a volumetric medical image). The volumetric medical image may be made up of a number of slices, i.e., 2D (two-dimensional) medical images. The 2D medical images may be captured by and received from the medical imaging unit mentioned above. The 2D medical images may then be assembled to form the volumetric medical image.

Presently, a voxel represents a value in three-dimensional space, whereas a pixel represents a value in two-dimensional space. The pixels or voxels may or may not have their position, i.e., their coordinates explicitly encoded with their values. Instead, the position of a pixel or voxel is inferred based upon its position relative to other pixels or voxels (i.e., is positioned in the data structure that makes up a single 2D or 3D (volumetric) image). The voxels may be arranged on a 3D grid, the pixels on a 2D grid. The 2D medical image may, for example, be in the form of an array of pixels. The volumetric medical image may comprise an array of voxels. The pixels or voxels may be representative of intensity, absorption or 20 other parameters as a function of a three-dimensional position, and may, for example, be obtained by a suitable processing of measurement signals obtained by one or more of the above-mentioned medical imaging units.

The at least one marker is associated with a location in the reference medical image. The at least one marker may be any suitable data structure which, when output on a display device, gives the user (e.g., radiologist) guidance as to where a specific feature in the reference medical image can be found. The at least one marker may comprise one or more of different elements such as end points, lines, cross hairs, circles, and combinations thereof. The marker may be associated via defined coordinates (e.g., x, y, z) with the location. The coordinates may be part of the data structure of the marker or may be otherwise linked thereto. The association of the marker with the location may also be merely a result of how the marker is integrated or related to the data of the reference medical image.

The at least one marker may refer to the same anatomical object within the target and reference image. The anatomical object may comprise an organ, lesion or tumor (other finding), or portion thereof, respectively. The at least one marker may by be configured (when output on the display device) to indicate the location of the anatomical object. The marker may include various properties. For example, the marker may include a label including semantics, e.g. telling its x, y, z-coordinates, the type of finding, etc. (all "properties" in the sense of the present application). The marker may include a measurement as a property. For example, the measurement may tell the size of a finding. The size may be shown by a line reaching between opposing edges of the finding. In addition, or instead, there may be a label telling the size of the finding.

The location and corresponding location of the at least one marker may refer to the entire marker, or to elements thereof. For example, where the marker is a crosshair, square, rectangle or circle, the location may refer to a center point of the marker at which the marker (image) is attached or matched to the reference medical image. The crosshair may then be moved from said location to the new (corresponding) location in the target medical image by matching its center point to said new location. In this case, the entire marker's position is described by a single location (e.g., one set of coordinates x, y, z) in the reference and target image, respectively. However, in other cases, the marker may comprise two elements such as endpoints where each element has its own location (e.g., respective set of coordinates) in the reference medical image. Then, two corresponding locations may be determined in step d) and each element is moved to its new (corresponding) location in the target medical image. In one embodiment, no more than 10, 5, 3, 2 or 1 corresponding locations are determined per marker in step d). This may reduce computation time.

The target medical image is overlaid with the at least one marker at the determined location to provide an overlaid image. This is to say that a data structure (e.g., image file) is created which relates the at least one marker to the target medical image.

Display data is generated to cause a display device to display the overlaid image. The display device can be any of a screen, projector, etc. Display data refers to data which is configured to control a display device.

In embodiments, multiple reference medical images (e.g., series) and markers are received in steps a) and c), followed by multiple corresponding locations being determined in step d) and overlaying the target image with multiple markers in step e). The resulting overlaid images thus has multiple markers in the target medical image, thus allowing a user to even better identify growth of a tumor, for example.

In an embodiment, step d) comprises performing a registration between the target and reference image. According to some examples, said registration may be based on an evaluation of image data similarities. According to other examples, this may comprise obtaining a deformation field between the target medical image and the reference medical image that determines a relationship between the coordinate systems of the target medical image and the reference medical image such that each anatomical location in the target medical image is mapped to the same anatomical location in the reference medical image and vice versa. Thus, the deformation field may comprise a plurality of individual displacement vectors respectively associated with the pixels/voxels of the target image and the reference image. In one example, registration is done using a registration algorithm. In one example, registration is done only at the location(s) where the marker(s) is/are located, without calculating the registration at other locations of the target and reference medical image.

According to some examples, the registration may comprise a rigid registration. A rigid registration may comprise a registration in which the coordinates of pixels/voxels in one image are subject to rotation and translation in order to register the image to another image. According to some examples, the registration may comprise and affine registration. An affine registration may comprise a registration in which the coordinates of data points in one image are subject to rotation, translation, scaling and/or shearing in order to register the image to another image. Thus, a rigid registration may be considered to be a particular type of affine registration. According to some examples, the registration may comprise a non-rigid registration. A non-rigid registration may provide different displacements for each pixel/voxel of the image to be registered and can, for example, use non-linear transformations, in which the coordinates of pixels/voxels in one image are subject to flexible deformations in order to register the image to another image.

Non-linear transformations may, according to some examples, be defined using vector fields such as warp fields, or other fields or functions, defining an individual displacement for each pixel/voxel in an image. For more detailed information about image registration, reference is made to US 2011/0081066 and US 2012/0235679. Rigid image registration is effective in cases when no anatomic change or deformations are expected. In comparison to rigid image registration, non-rigid image registration has a significantly greater flexibility as non-rigid image registrations can manage local distortions between two image sets (e.g., anatomical structure changes) but can be more complex to handle.

In a further embodiment, the registration comprises: generating a first descriptor by sampling image data in the reference medical image encompassing the location of the at least one marker; generating second descriptors by sampling image data for each of a plurality of candidate locations in the target medical image; calculating, for each of the plurality of candidate locations, an image data similarity metric indicating a degree of similarity between the first descriptor and the second descriptors; selecting a candidate location from among the plurality of candidate locations based on the calculated similarity metric; and determining the corresponding location in the target medical image based on the selected candidate location.

In this manner, registration can be performed fast, in particular in real time as the radiologist reads the images. Sampling of the pixels or voxels in the image data to provide the first and/or second descriptor may be done by reading from a data file, a database, a (e.g., temporary) memory, or an array comprising the pixels or voxels. Sampling of the pixels or voxels can be done sequentially or in parallel (for example when multiple pixels or voxels are read at the same time). At least one pixel or voxel may be skipped between two sampled pixels or voxels. This is to say that, when looking at all the pixels or voxels of the reference and target medical image in their two- or three-dimensional relationship, at least one pixel or voxel between two sampled pixels or voxels is not sampled. For example, the reference or target medical image may comprise a first, second and third pixel or voxel arranged in the same row or column. In this case, only the first and third pixel or voxel are sampled, the second pixel or voxel is not sampled. It may be provided that, first, the first pixel or voxel and then the third pixel or voxel is sampled. Alternatively, the first and third pixel or voxel are sampled in parallel.

The sampled pixels or voxels may be saved in memory. For example, the pixels or voxels are sampled in a sparse and/or random manner. "Sparse" is to be understood as, when having regard to the total number of pixels or voxels making up the reference and/or target medical image, only few pixels or voxels are being used in sparse sampling. In particular, "sparse" is to say that less than 50% or less than 20% or even less than 10% of the total number of pixels or voxels of the reference and/or target medical image are sampled. "Random" is to say that the sampled pixels or voxels do not follow a regular pattern (except that, e.g., at least one pixel or voxel may be skipped between two sampled pixels or voxels). In some embodiments, a random number generator or pseudorandom number generator may be used to select the pixels or voxels to be sampled. For example, the pixels or voxels are sampled with a sampling rate per unit length, area or volume which decreases with a distance of the respective pixel or voxel from the location of the at least one marker and/or candidate location. For example, the sampling rate decreases at a nonlinear rate, in particular at the rate of an exponential, logarithmic or power function. In one embodiment, the sampled pixels or voxels are less than 1%, preferably less than 0.1%, and more preferably less than 0.01% of the total number of pixels or voxels in the reference or target medical image. Sampling may be done using a sampling model. The sampling model contains the information about the location of the pixels or voxels in the reference or target medical image which are to be sampled, thus providing the descriptor. The sampling model can be or make use of an algorithm, for example. The metric indicating a degree of similarity may comprise or relate parameters (pertaining to the first and second descriptors) such as brightness, color, shape etc.

In a further embodiment, step d) comprises:
determining, based on the registration, an initial corresponding location; and
determining a refined corresponding location by one or more of the following steps:
selecting, in the target medical image, a neighborhood region encompassing the initial corresponding location,
generating a descriptor by sampling image data encompassing the initial corresponding location,
applying a trained neural network to the neighborhood region or to the descriptor to output the refined corresponding location, and/or
applying an edge detection algorithm to the neighborhood region or to the descriptor to output the refined corresponding location.

Different ways for providing a refined corresponding location can be conceived. The descriptor may be sampled and/or defined as explained above with respect to the first and second descriptor, for example. The output of the evaluation using the neural network is the refined corresponding location. For example, tumor boundaries (not necessarily only edges which typically correspond to a sharp change in brightness) may be marked in the reference image. When the tumor grows, those boundaries may change in shape, color etc. To find the corresponding location only by registration may be difficult. The neural network may be trained to take into account such changes and thereby output the correct corresponding location. To this end, the training data may include series of images of tumors or lesions as they develop over time. The edge detection algorithm on the other hand may rely on image processing techniques only and does not require a neural network or training. By selecting a neighborhood region prior to applying the neural network and/or the edge detection algorithm, the amount of data processing required may be reduced.

According to a further embodiment, the neural network is a regressor.

"Regressor" stands for regression neural network. The regressor, in one embodiment, may calculate or employ the difference between the initial corresponding location and the refined corresponding location. The neural network (which is in a preferred embodiment a regressor) can be, e.g., a multilayer perceptron, a convolutional neural network, a Siamese network and/or a triplet network.

According to a further embodiment, the regressor is trained prior to step d) using a self-supervised training method.

Therein, the regressor learns from unlabeled sample data. In an example, the regressor may be trained with a self-supervised method to estimate the displacement with simulated displacement between corresponding locations. Thus, the displacement estimation would refine the end points of the measurement according to changes in the finding.

According to a further embodiment, the regressor is based on deep learning.

According to a further embodiment, the regressor is trained using lesion marker data sets.

Lesion marker data sets are data sets of images showing lesions which have been marked. For example, the regressor may estimate the size of the finding from the given seed locations. Thus, it would adapt the transferred measurement to the new image.

According to a further embodiment, the at least one marker comprises two end points, wherein the target and reference image are slices and the two end points are located within a respective slice.

"Slices" refer to two-dimensional medical images which may be taken using a medical imaging device, e.g., along the axial, sagittal or coronal directions.

According to a further embodiment, the at least one marker is associated with a region in the target and/or reference image, all pixels in said region having a value above, below or between a value defined prior to step d).

This has the advantage of the at least one marker being easier to identify.

According to a further embodiment, the at least one marker may comprise one or more of the following:
two end points and a distance line connecting the end points;
two end points and a circle, the radius of which is derived from the two end points, wherein the circle is centered between the two end points; and
a crosshair.

According to a further embodiment, at least one property of the at least one marker overlaid in step e) is automatically adjusted compared to at least one property of the at least on marker received in step c) depending on a change in at least one property of the target medical image compared to the reference medical image.

Advantageously, the property of the marker is changed taking account of the target medical image. This saves the user the work of newly adding or changing the property manually. On the other hand, not changing any of the properties (or at least not the size of the marker) but overlaying the marker as received in step c) over the target image in step e) may also be advantageous since this allows the user (e.g., radiologist) to easily eyeball any changes in the size of the anatomical object.

According to a further embodiment, the at least one property of the at least one marker is a size of the at least one marker when output on the display device and/or wherein the at least one property of the target image compared to the reference medical image is a size of an anatomical object within the target and reference medical image to which the at least one marker refers.

For example, the size of a measurement line in the reference image is changed automatically to account for a tumor which has grown in the time between the reference and the target image have been taken. The method may employ an edge recognition algorithm to identify the new (e.g., larger) outline of the tumor (or any other finding). The marker (e.g., measurement) is then adjusted to the new outline.

According to a second aspect, a device for processing medical images is provided. The device comprises:
one or more non-transitory computer-readable media for storing a module;
a first receiving unit which is configured to receive at least one target and at least one reference medical image captured by a medical imaging unit;
a second receiving unit which is configured to at least one marker associated with a location in the reference medical image; and
one or more processing units in communication with the one or more non-transitory computer-readable media, the one or more processing units being operative with the module to perform the method steps as described above.

The respective unit, for example, the processing or the first or second receiving unit, may be implemented in hardware and/or software. If said unit is implemented in hardware, it may be embodied as a device, for example as a computer or as a processor or as a part of a system, for example a computer system. If said unit is implemented in software, it may be embodied as a computer program, as a function, as a routine, as a program code or as an executable object.

According to a third aspect, a system for processing medical images is provided. The system comprises:
one or more servers; and
a medical imaging unit coupled to the one or more servers, the one or more servers comprising instructions, which when executed cause the one or more servers to perform the method steps as claimed described above.

According to a fourth aspect, a computer program product comprising machine readable instructions, that when executed by one or more processing units cause the one or more processing units to perform method steps as described above.

A computer program product, such as a computer program means, may be embodied as a memory card, universal serial bus (USB) stick, compact disc read-only memory (CD-ROM), digital video disc (DVD) or as a file which may be downloaded from a server in a network. For example, such a file may be provided by transferring the file comprising the computer program product from a wireless communication network.

According to a fifth aspect, one or more non-transitory computer-readable media embodying instructions (or program code) executable by machine are provided. The instructions are loadable into and/or executable in a machine to make the machine execute the method steps or operations as described above.

The features, advantages and embodiments described with respect to the first aspect equally applies to the second and following aspects, and vice versa.

"A" is to be understood as non-limiting to a single element. Rather, one or more elements may be provided, if not explicitly stated otherwise. Further, "a", "b" etc. in steps a), step b) etc. is not defining a specific order. Rather, the steps may be interchanged as deemed fit by the skilled person.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

Further embodiments, features, and advantages of the present invention will become apparent from the subsequent description and dependent claims, taken in conjunction with the accompanying drawings, in which:

Hereinafter, embodiments for carrying out the present invention are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1 provides an illustration of a block diagram of a client-server architecture embodying a system for processing medical images. The client-server architecture 100 comprises a server 101 and a plurality of client devices 107A-N. Each of the client devices 107A-N is connected to the server 101 via a network 105, for example, local area network (LAN), wide area network (WAN), Wi-Fi, etc. In one embodiment, the server 101 is deployed in a cloud computing environment. As used herein, "cloud computing environment" refers to a processing environment comprising configurable computing physical and logical resources, for example, networks, servers, storage, applications, services, etc., and data distributed over the network 105, for example, the internet. The cloud computing environment provides on-demand network access to a shared pool of the configurable computing physical and logical resources. The server 101 may include a medical database 102 that comprises medical images related to a plurality of patients that is maintained by a healthcare service provider. In an embodiment, the medical database 102 comprises target and reference medical images captured by a MR scanner and/or by a CT scanner. The server 101 may include a module 103 that is configured to perform processing of medical images, in particular as described hereinafter.

The client devices 107A-N are user devices, used by users, for example, medical personnel such as a radiologist, pathologist, physician, etc. In an embodiment, the user device 107A-N may be used by the user to receive medical images associated with the patient. The data can be accessed by the user via a graphical user interface of an end user web application on the user device 107A-N. In another embodiment, a request may be sent to the server 101 to access the medical images associated with the patient via the network 105.

An imaging unit 108 may be connected to the server 101 through the network 105. The unit 108 may be a medical imaging unit 108 capable of acquiring a plurality of medical images. The medical imaging unit 108 may be, for example, a scanner unit such as a magnetic resonance imaging unit, computed tomography imaging unit, an X-ray fluoroscopy imaging unit, an ultrasound imaging unit, etc.

Figure 2:
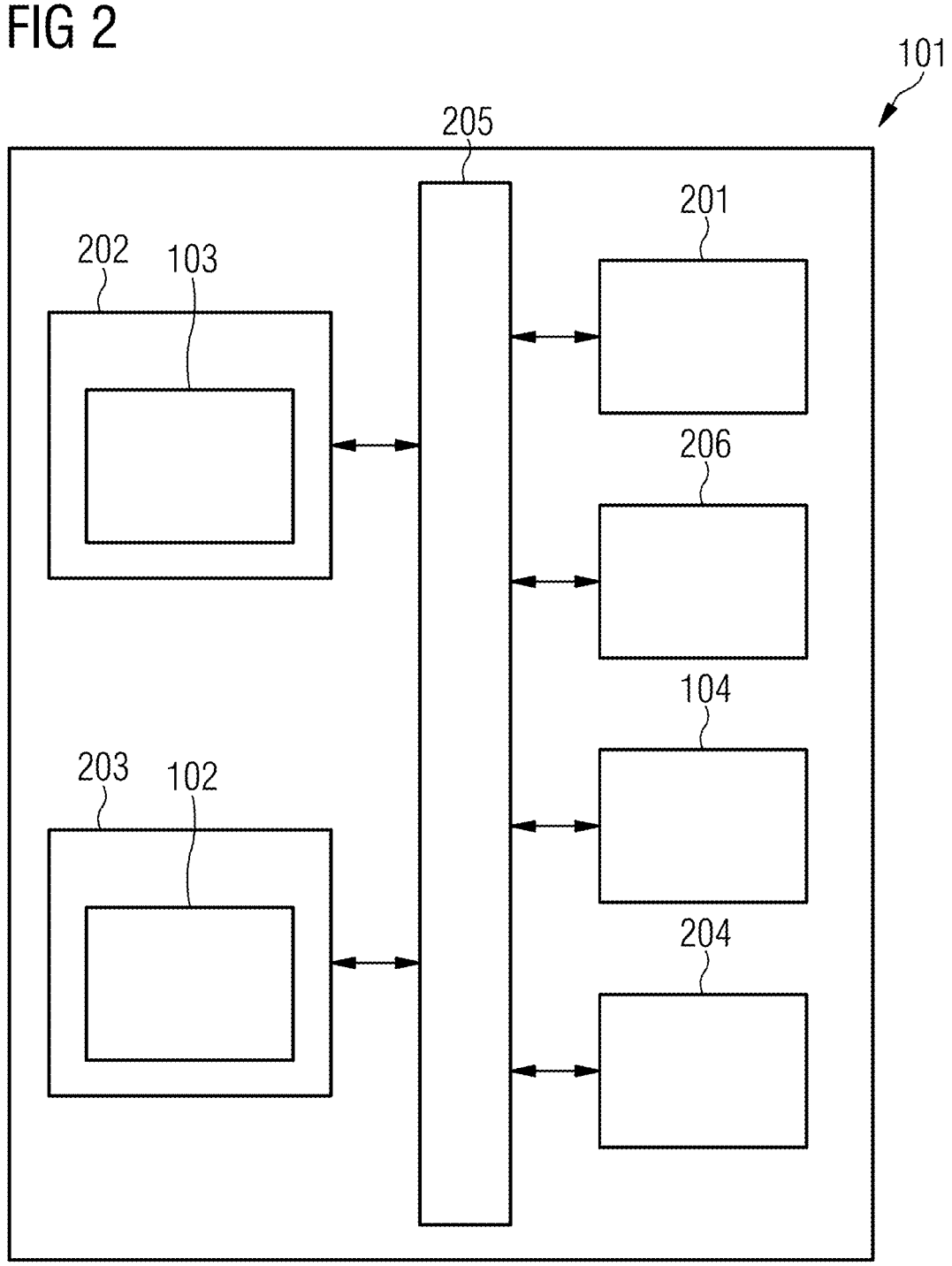
FIG. 2 illustrates a block diagram of a data processing system embodying a device foridentifying a type or organ in a volumetric medical image.

FIG. 2 is a block diagram of a data processing system 101 in which an embodiment can be implemented, for example, as a system 101 for processing medical images, configured to perform the processes as described herein. It is appreciated that the server 101 is an exemplary implementation of the system in FIG. 2. In FIG. 2, said data processing system 101 comprises a processing unit 201, a memory 202, a storage unit 203, an input unit 204, an output unit 206, a bus 205, and a network interface 104.

The processing unit 201, as used herein, means any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 101 may also include embedded controllers, such as generic or programmable logic devices or arrays, application specific integrated circuits, single-chip computers, and the like.

The memory 202 may be volatile memory and non-volatile memory. The memory 202 may be coupled for communication with said processing unit 201. The processing unit 201 may execute instructions and/or code stored in the memory 202. A variety of computer-readable storage media may be stored in and accessed from said memory 202. The memory 202 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 201 comprises a module 103 stored in the form of machine-readable instructions on any of said above-mentioned storage media and may be in communication to and executed by processing unit 201. When executed by the processing unit 201, the module 103 causes the processing unit 201 to processing medical images. Method steps executed by the processing unit 201 to achieve the abovementioned functionality are elaborated upon in detail in the following figures.

The storage unit 203 may be a non-transitory storage medium which stores the medical database 102. The input unit 204 may include input means such as keypad, touch-sensitive display, camera (such as a camera receiving gesture-based inputs), a port etc. capable of providing input signal such as a mouse input signal or a camera input signal. The bus 205 acts as interconnect between the processor 201, the memory 202, the storage unit 203, the input unit 204, the output unit 206 and the network interface 104. The target and reference medical images may be read into the medical database 102 via the network interface 104 or the input unit 204, for example.

Those of ordinary skilled in the art will appreciate that said hardware depicted in FIG. 1 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter also may be used in addition or in place of the hardware depicted. Said depicted example is provided for the purpose of explanation only and is not meant to imply architectural limitations with respect to the present disclosure.

A data processing system 101 in accordance with an embodiment of the present disclosure may comprise an operating system employing a graphical user interface (GUI). Said operating system permits multiple display windows to be presented in the graphical user interface simultaneously with each display window providing an interface to a different application or to a different instance of the same application. A cursor in said graphical user interface may be manipulated by a user through a pointing device. The position of the cursor may be changed and/or an event such as clicking a mouse button, generated to actuate a desired response.

One of various commercial operating systems, such as a version of Microsoft Windows™, a product of Microsoft Corporation located in Redmond, Washington may be employed if suitably modified. Said operating system is modified or created in accordance with the present disclosure as described. Disclosed embodiments provide systems and methods for processing medical images.

Figure 3:
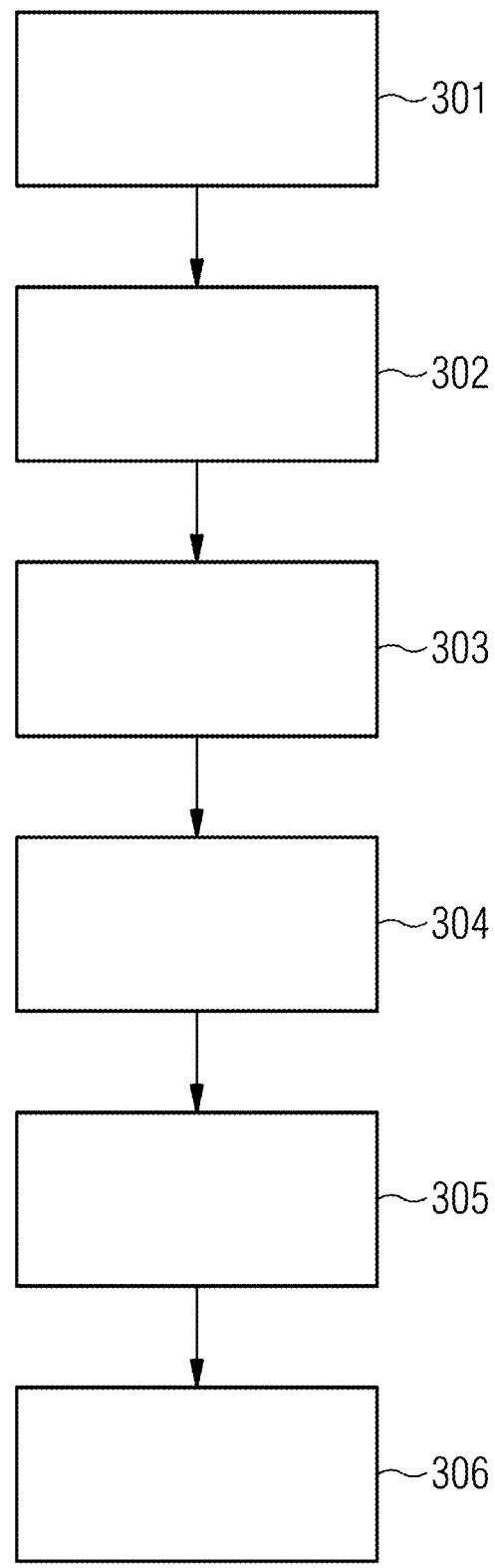
FIG. 3 illustrates a flowchart of an embodiment of a computer-implemented method for processing medical images.

FIG. 3 illustrates a flowchart of an embodiment of a method for processing medical images.

Figure 4:
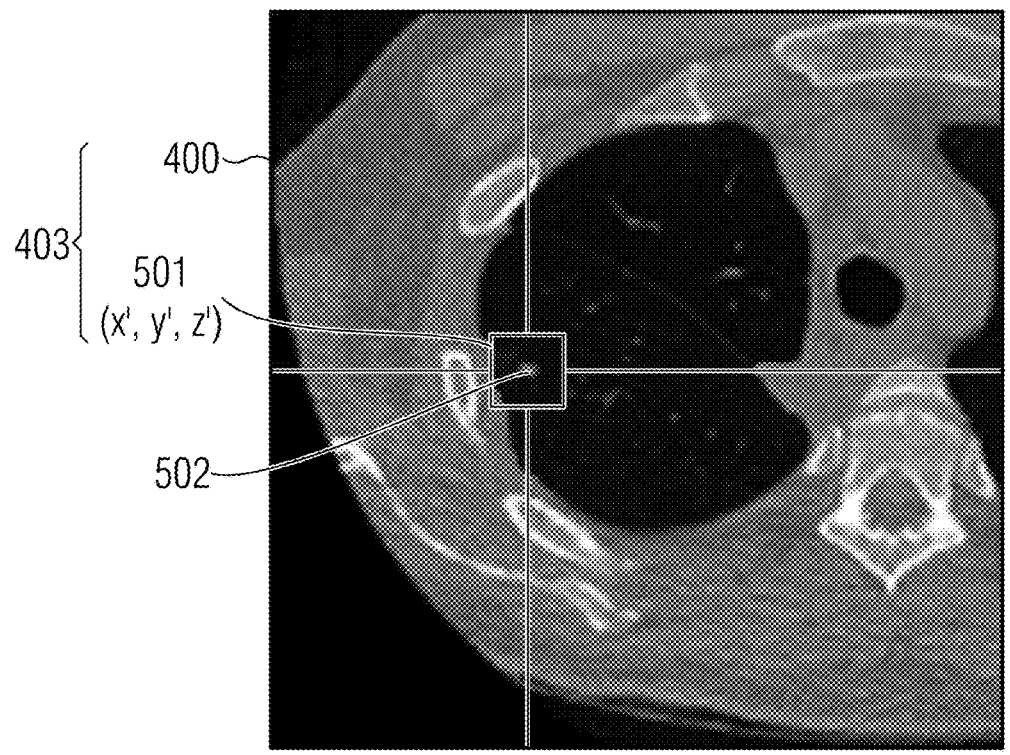
FIG. 4 illustrates a target medical image according to an embodiment.
Figure 5:
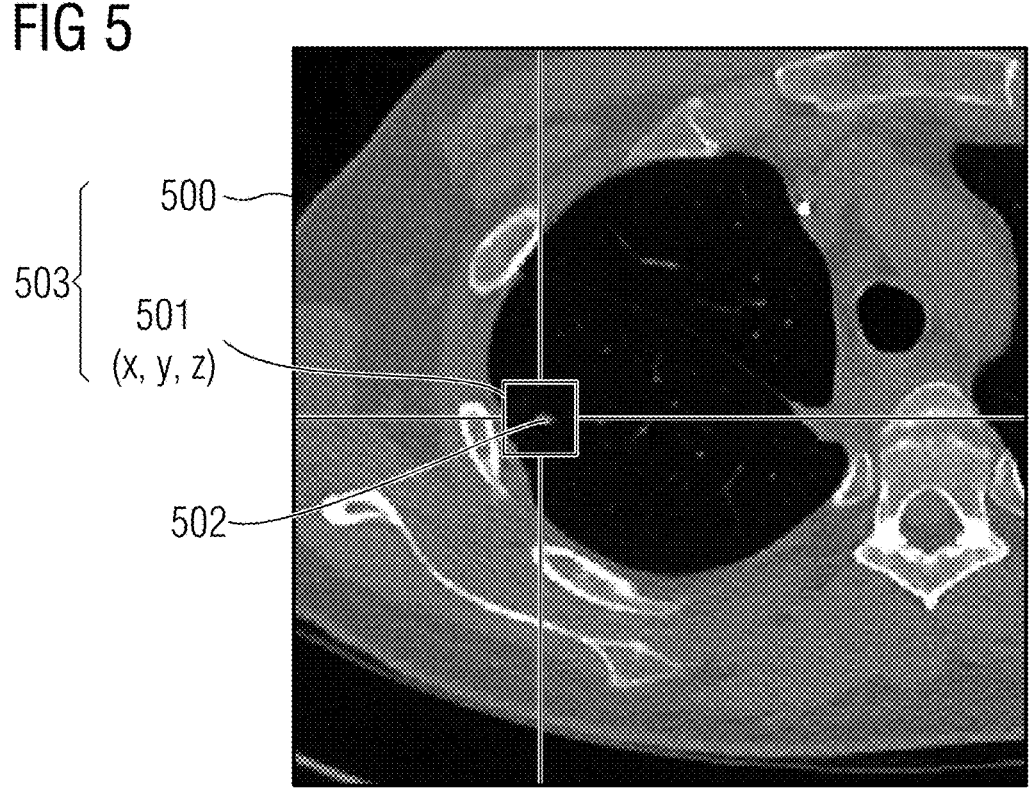
FIG. 5 illustrates a reference medical image according to an embodiment.

In steps 301-303, a target medical image 400 (see FIG. 4), a reference medical image 500 (see FIG. 5) and a marker 501 (see also FIG. 5) are received, e.g., in the memory 202 (see FIG. 2). The medical images 400, 500 as well as the marker 501 are, for example, received in the data processing systems 101 through the network interface 104 or the input unit 203.

The marker 501 is a crosshair in this example. The marker 501 indicates the location of a lesion 502 in the reference medical image 500. The marker 502 is for example a secondary image and the reference medical image 500 (primary image) is overlaid with the secondary image to form an overlaid image 503. The marker 502 is associated with a location in the reference medical image 500. To this end, spatial coordinates x, y, z of the marker 502 in the reference medical image 500 are stored in one data file along with the primary and secondary images, for example.

The marker 502 may have been generated via a GUI (graphical user interface) by a doctor using the user device 107A at a first point in time in the past. At that point in time, the reference image 500 was taken using the medical imaging device 108 (see FIG. 1), in this case a two-dimensional image ("slice") on the axial plane through the patient's lung.

At a second point in time (later date), the same patient has a follow-up appointment with the doctor. Again, an image is taken of the patient's lung using the medical imaging device 108, this image being the target image 400. The target image 400 is taken on the same plane as the reference image 500, and thus shows substantially the same anatomical objects as the reference image 500. However, in the time that has passed, the lesion 502 has grown, and, for example, due to breathing movements the lesion 502 may be arranged at a slightly different location compared to its position in the reference image 500.

Now, in step 304, using the processing unit 201, a corresponding location of the marker 501 in the target medical image 400 is determined. This is preferably done by performing a registration between the target and reference medical image 400, 500 using a registration algorithm. For example, the registration algorithm compares brightness values in either image 400, 500 and, based on said comparison, determines a transformation of the reference image 500 onto the target image 400. Using this transformation, the spatial coordinates x', y', z' of the marker 501 in the target image 400 are found.

In step 305, using the processing unit 201, the target image 400 is overlaid with the marker 501 (primary image) at the corresponding location x', y', z' to provide an overlaid image 403. The overlaid image 403 is, e.g., stored in the memory 202 (see FIG. 2). In this example, the size of the marker 501 is constant and does not change with the increase in size of the lesion 502 between the target and reference medical image 400, 500.

In step 306, for example the processing unit 201 generates display data to cause a display device 109 of the user device 107A to display the overlaid image 403. The generated display data may be output via the output unit 206 or the network interface 104 to the display device 109.

Figure 6:
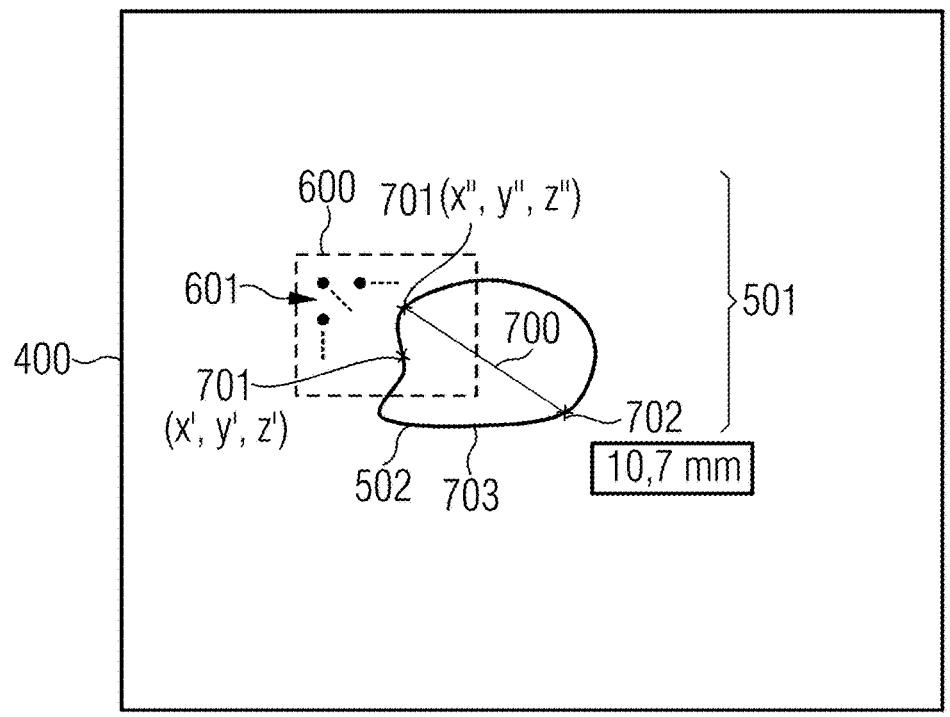
FIG. 6 shows a schematic view of a target medical image according to an embodiment.
Figure 7:
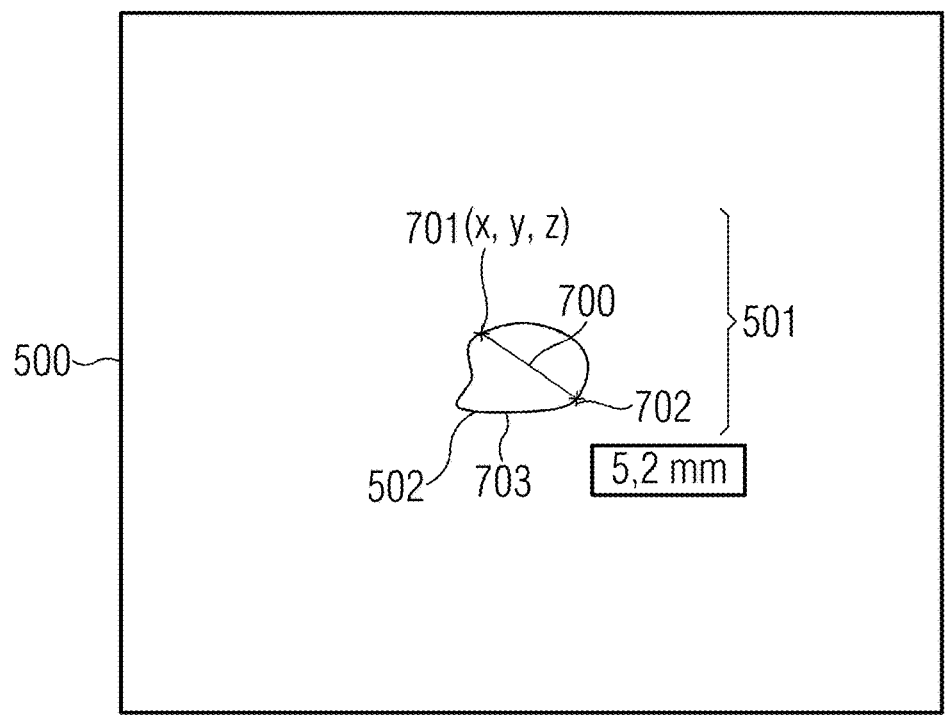
FIG. 7 shows a schematic view of a reference medical image according to an embodiment.

With reference to FIGS. 6 and 7 further embodiments of the present method are explained, with a focus on step 304 above. Therein, FIG. 6 shows schematically the target image 400 of FIG. 4, and FIG. 7 the reference image 500 of FIG. 5.

In this example, the marker 501 in FIG. 7 comprises a measurement line 700 connecting two end points 701, 702 lying on opposite sides of the outline (perimeter or edge) 703 of the lesion 502. The measurement line 700 is applied by the doctor to the reference medical image 500 when initially seeking to measure the size of the lesion 502 using the GUI, for example. A measurement value (here "5.2 mm") may also be shown next to the measurement line 700.

After performing a registration between the target image and reference medical image 400, 500 in step 304, the determined transformation is applied to find the coordinates x', y', z' of the marker 501. This is illustrated only for the end point 701 by way of example. The coordinates x', y', z' represent an (initial) corresponding location of the end point in the target image 400.

These coordinates may be refined in a further step (in which case the corresponding location is an initial one). To this end, a neighborhood region 600 within the target medical image 400 is selected. The neighborhood region 600 includes the coordinates x', y', z'. The neighborhood region 600 may, for example, include less than 50%, less than 10% or even less than 3% of the total number of pixels in the target medical image 400. Then, a descriptor 601 is generated based on pixels sampled from the neighborhood region 600. Any of the above-mentioned techniques such as sparse sampling and/or sampling with a sampling rate per unit length which decreases with the distance from the initial corresponding location x', y', z' may be used. The generated descriptor 601 is evaluated using a trained neural network to obtain the refined corresponding location x", y", z" of the end point 701. The neural network may be a regressor which has been trained prior to step 301 (see FIG. 3). The regressor may be trained using a self-supervised method based on lesion marker data sets. Thereby, the regressor is particularly suited to detect the outline 703 of the lesion 502, and thereby to correctly associate the pixel(s) at coordinates x, y, z in the reference image 500 with the pixel(s) at coordinates x", y", z". In another embodiment, the descriptor 601 is sampled directly from image data of the target medical image 400 at and/or around (i.e., encompassing) the location of the initial corresponding location, without prior selection of a neighborhood region 600. In one embodiment, the trained neural network is applied the neighborhood region 600 directly, without using a descriptor. Also, instead of using the trained neural network (or in addition thereto), an edge detection algorithm may be applied to the pixels in the neighborhood region 600, to the descriptor or (directly) to the target medical image 400 to detect the outline 703, and thereby to correctly associate the pixel(s) at coordinates x, y, z in the reference image 500 with the pixel(s) at coordinates x", y", z".

Also, the measurement line 700 which represents the size of the lesion 502 is automatically extended, for example, by the processing unit 201 to match the increase in size between the target and reference image 400, 500. Also, the measurement value may be adjusted automatically (here to "10.7 mm").

Figure 7A:
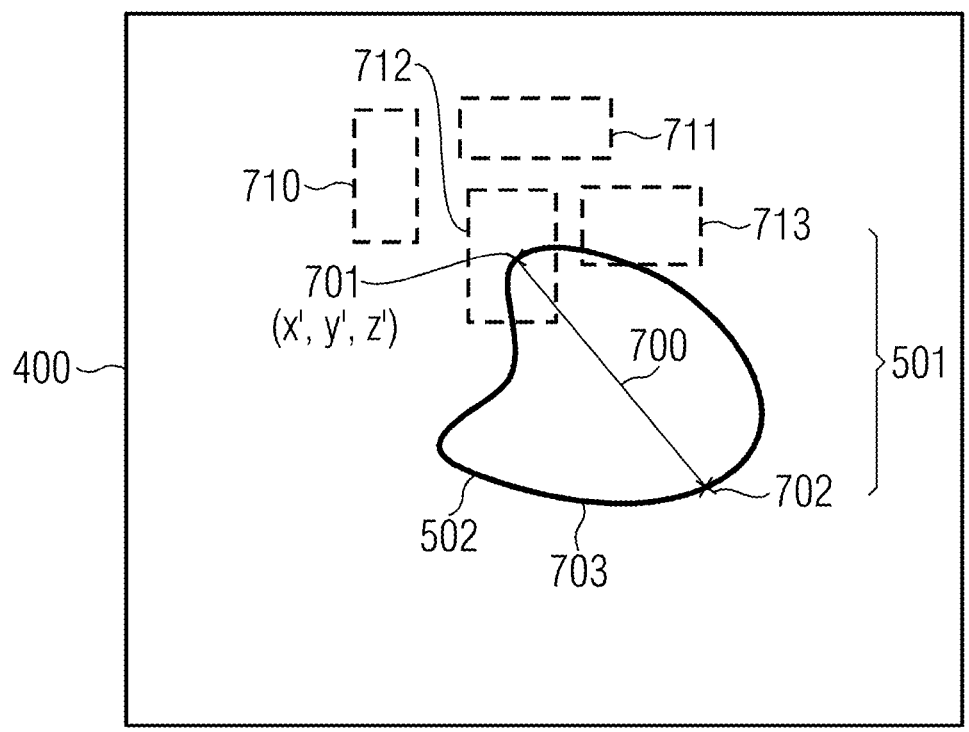
FIG. 7A shows a schematic view of a target medical image according to a further embodiment.
Figure 7B:
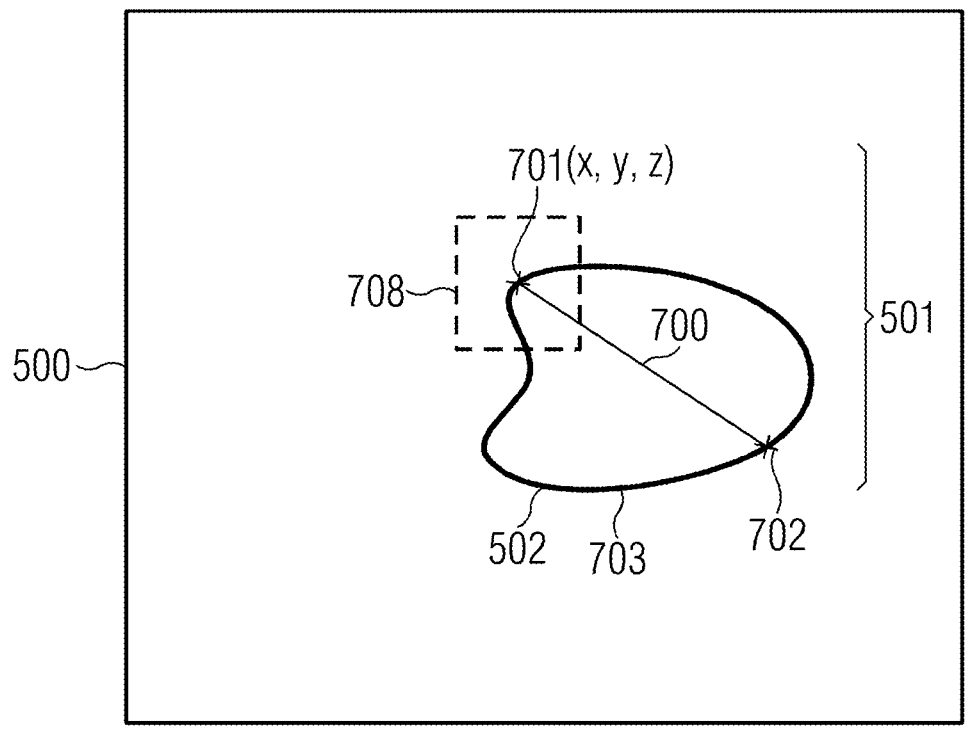
FIG. 7B shows a schematic view of a reference medical image according to a further embodiment.

FIGS. 7A and 7B illustrate steps to provide for a fast registration according to one example. Therein, FIG. 7A is based on the target medical image 400 of FIG. 6, and FIG. 7B is based on the reference medical image 500 of FIG. 7.

In a first step of the registration process, a first descriptor 708 (indicated by a rectangle for ease of representation) is generated by sampling image data in the reference medical image 500 at and/or around (i.e., encompassing) the location x, y, z of the end point 701. Any of the above-mentioned techniques such as sparse sampling and/or sampling with a sampling rate per unit length which decreases with the distance from the location x, y, z may be used.

Then, second descriptors 710-713 (indicated respectively by a rectangle for ease of representation) are generated by sampling image data for each of a plurality of candidate locations in the target medical image 400. Any of the above-mentioned techniques such as sparse sampling and/or sampling with a sampling rate per unit length which decreases with the distance from the candidate location (each candidate location does not have a reference numeral but may correspond to the center point of each rectangle 710-713) may be used. The candidate locations may be found using a predefined (e.g., random) scheme, algorithm, etc. According to one embodiment, the candidate locations are chosen such that the distance between each candidate location and the location x, y, z (taken from the reference image 500) does not exceed a predefined threshold value.

Next, for each of the plurality of candidate locations, an image data similarity metric indicating a degree of similarity between the first descriptor 708 and the second descriptors 710-713 is calculated.

In another step, a candidate location from among the plurality of candidate locations is selected based on the calculated similarity metric.

The corresponding location x', y', z' of the endpoint 701 in the target medical image 400 is then determined based on the selected candidate location (in this case the center point of the rectangle corresponding to the second descriptor 712).

Figure 8:
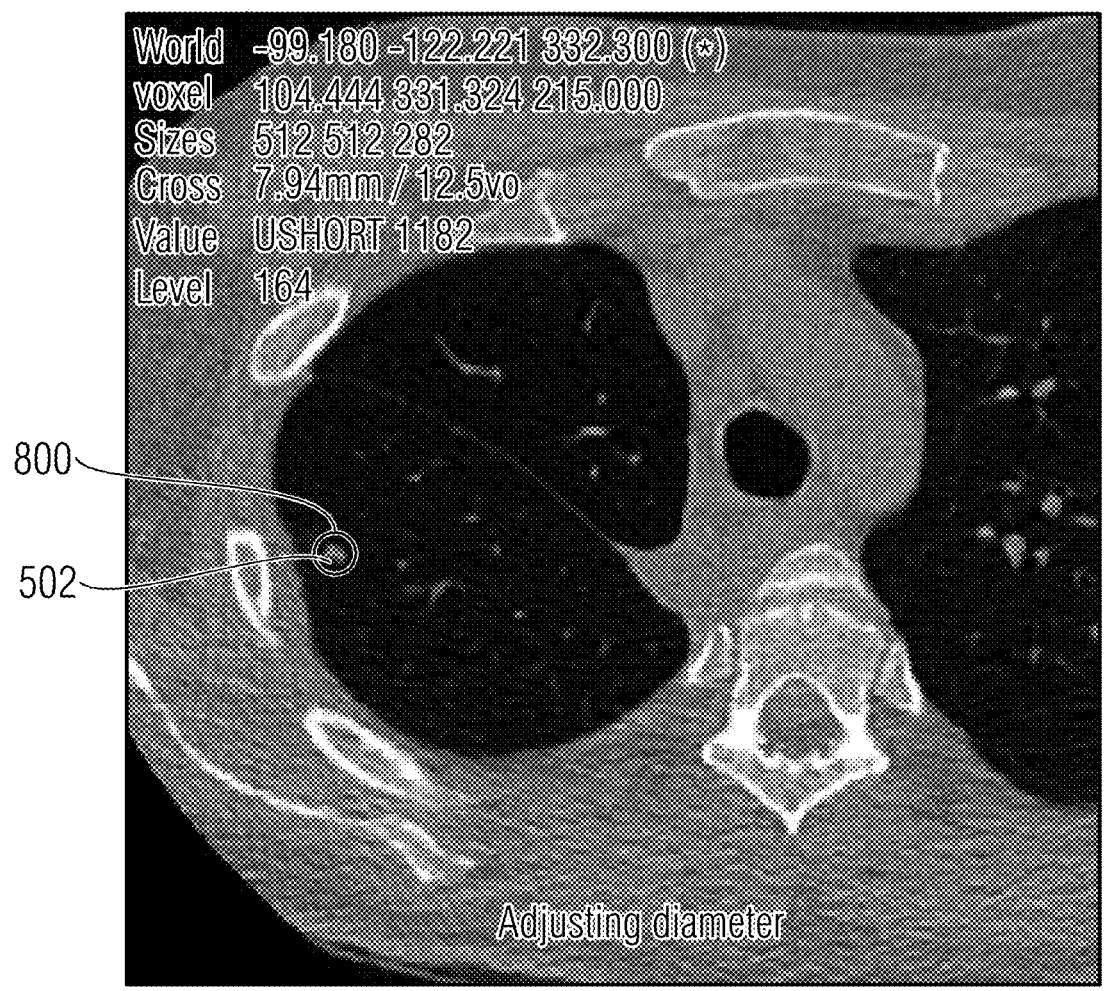
FIG. 8 shows a target medical image comprising a circle as a marker according to an embodiment.
Figure 9:
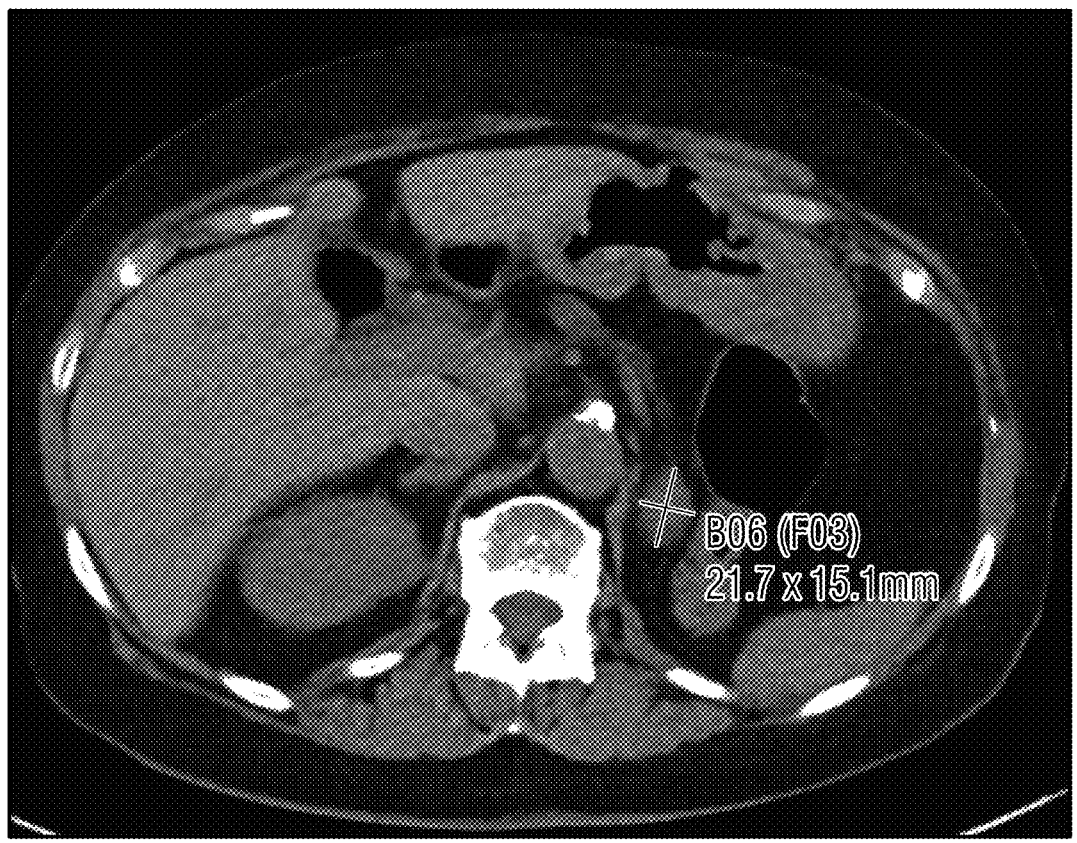
FIG. 9 a prior art image.

FIG. 8 shows an example of a marker 501 comprising a circle 800 (spanning two endpoints—not shown—on the outline of the lesion 502). The radius of the circle 800 is adjusted automatically in response to any changes in size of the marked anatomical object (here the lesion 502) between the target and reference image 400, 500 (only the image 400 being shown in FIG. 8).

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein, rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

REFERENCE SIGNS 100 system
101 computer-implemented device
102 medical database
103 module
104 network interface
105 network
107A-107N client device
108 medical imaging unit
109 display device
201 processing unit
202 memory
203 storage unit
204 input unit
205 bus
206 output unit
301-306 method steps
400 target medical image
403 overlaid image
500 reference medical image
501 marker
502 lesion
503 overlaid image
600 neighborhood region
601 descriptor
700 measurement line
701, 702 end points
703 outline
708 first descriptor
710-713 second descriptors
800 circle
x, y, z coordinates
x', y', z' coordinates
x", y", z" coordinates

The invention claimed is:

1. A computer-implemented method for processing medical images, the method comprising:
a) receiving a target medical image;
b) receiving a reference medical image;
c) receiving at least one marker associated with a location (x, y, z) in the reference medical image;
d) determining a corresponding location (x', y', z') of the at least one marker in the target medical image;
e) overlaying the target medical image with the at least one marker at the corresponding location (x', y', z') to provide an overlaid image, wherein at least one property of the at least one overlaid marker is automatically adjusted compared to at least one property of the at least one marker received in step c) depending on a change in at least one property of the target medical image compared to the reference medical image; and
f) generating display data to cause a display device to display the overlaid image.

2. The method of claim 1 wherein step d) comprises performing a registration between the target medical image and the reference medical image.

3. The method of claim 2, wherein the registration comprises: generating a first descriptor by sampling image data in the reference medical image encompassing the location (x, y, z) of the at least one marker;
generating second descriptors by sampling image data for each of a plurality of candidate locations in the target medical image;
calculating, for each of the plurality of candidate locations, an image data similarity metric indicating a degree of similarity between the first descriptor and the second descriptors;
selecting a candidate location from among the plurality of candidate locations based on the image data similarity metric; and
determining the corresponding location (x', y', z') in the target medical image based on the selected candidate location.

4. The method of claim 2, wherein step d) comprises:
determining, based on the registration, an initial corresponding location (x', y', z'); and
determining a refined corresponding location (x", y", z").

5. The method of claim 4 wherein determining the refined corresponding location (x", y", z") comprises:
selecting, in the target medical image, a neighborhood region encompassing the initial corresponding location (x', y', z');
generating a descriptor by sampling image data encompassing the initial corresponding location (x', y', z'); and applying a trained neural network to the neighborhood region or to the descriptor to output the refined corresponding location (x", y", z").

6. The method of claim 5 further comprising:
applying an edge detection algorithm to the neighborhood region or to the descriptor to output the refined corresponding location (x", y", z").

7. The method of claim 5 wherein the trained neural network is a regressor.

8. The method of claim 7 wherein the regressor is trained prior to step d) using a self-supervised training method.

9. The method of claim 7 wherein the regressor is based on deep learning.

10. The method of claim 7 wherein the regressor is trained using lesion marker data sets.

11. The method of claim 1 wherein the at least one marker comprises two end points, wherein the target medical image and the reference medical image are slices and the two end points are located within a respective one of the slices.

12. The method of claim 1 wherein the at least one marker is associated with a region in the target medical image or the reference medical image, wherein all pixels in said region having a value above, below or between a value defined prior to step d).

13. The method of claim 1, wherein the at least one marker comprises:
two end points and a distance line connecting the two end points;
two end points and a circle, a radius of which is derived from the two end points, wherein the circle is centered between the two end points; or
a crosshair.

14. The method of claim 1 wherein the at least one property of the at least one overlaid marker comprises a size of a measurement line.

15. The method of claim 1 wherein the at least one property of the at least one overlaid marker is a size of the at least one marker when output on the display device.

16. The method of claim 1 wherein the at least one property of the target medical image compared to the reference medical image is a size of an anatomical object within the target medical image and the reference medical image to which the at least one marker refers.

17. A device for processing medical images, comprising:
one or more non-transitory computer-readable media for storing a module;
a first receiving unit which is configured to receive at least one target medical image and at least one reference medical image captured by a medical imaging unit;
a second receiving unit which is configured to at least one marker associated with a location (x, y, z) in the reference medical image; and
one or more processing units in communication with the one or more non-transitory computer-readable media, the one or more processing units being operative with the module to perform steps including
a) determining a corresponding location (x', y', z') of the at least one marker in the target medical image,
b) overlaying the target medical image with the at least one marker at the corresponding location (x', y', z') to provide an overlaid image, wherein at least one property of the at least one overlaid marker is automatically adjusted compared to at least one property of the at least one marker received in step c) depending on a change in at least one property of the target medical image compared to the reference medical image, and
c) generating display data to cause a display device to display the overlaid image.

18. The device of claim 17 wherein the at least one marker is associated with a region in the target medical image or reference medical image, wherein all pixels in said region having a value above, below or between a value defined prior to step a).

19. The device of claim 17 wherein the at least one property of the at least one overlaid marker comprises a size of a measurement line.

20. One or more non-transitory computer-readable media embodying instructions executable by machine to perform steps comprising:
a) receiving a target medical image;
b) receiving a reference medical image;
c) receiving at least one marker associated with a location (x, y, z) in the reference medical image;
d) determining a corresponding location (x', y', z') of the at least one marker in the target medical image;
e) overlaying the target medical image with the at least one marker at the corresponding location (x', y', z') to provide an overlaid image, wherein at least one property of the at least one overlaid marker is automatically adjusted compared to at least one property of the at least one marker received in step c) depending on a change in at least one property of the target medical image compared to the reference medical image; and
f) generating display data to cause a display device to display the overlaid image.

\* \* \* \* \*